United States Patent [19]

Heffner et al.

[11] 4,231,556
[45] Nov. 4, 1980

[54] APPARATUS FOR HOLDING HOLLOW WALL PANELS WHILE THEY ARE FILLED WITH FOAMED PLASTIC

[75] Inventors: George R. Heffner, La Verne; Max Casutt, San Diego, both of Calif.

[73] Assignee: Grumman Flexible Corporation, Delaware, Ohio

[21] Appl. No.: 958,158

[22] Filed: Nov. 6, 1978

[51] Int. Cl.³ ............................................. B23Q 3/06
[52] U.S. Cl. ................... 269/22; 100/269 A; 269/315; 269/909
[58] Field of Search ............ 269/20, 22, 315, 321 W; 100/269 A; 144/281 A; 254/93 HP

[56] References Cited

U.S. PATENT DOCUMENTS

| | | | |
|---|---|---|---|
| 2,363,431 | 11/1944 | Moorhouse | 144/281 A |
| 2,363,779 | 11/1944 | Duffy et al. | 144/281 A |
| 3,135,998 | 6/1964 | Fowler et al. | 100/269 A X |
| 3,771,438 | 11/1973 | Radokovich | 100/269 A X |
| 4,109,901 | 8/1978 | Akin | 269/315 |

Primary Examiner—Robert C. Watson
Attorney, Agent, or Firm—Charles C. Logan, II

[57] ABSTRACT

Apparatus for holding hollow wall panels while they are filled with foamed plastic having a base, a lower platen, an upper platen, and a plurality of inflatable hoses. The base has a top pressure surface upon which the inflatable hoses are positioned. As fluid under pressure is released into the inflatable hoses, the upper surface of the hoses contact the bottom pressure surface of the lower platen to lift the lower platen upwardly. The hollow wall panels are supported by a plurality of longitudinally spaced roller support brackets that extend downwardly from the opposite sides of the upper platen. As the inflatable hoses are pressurized, the upward travel of the lower platen will cause its top pressure surface to contact the bottom of the hollow wall panels and hold them in rigid engagement against the bottom pressure surface of the upper platen. When the hollow wall panel is thus positioned, it is filled with foamed plastic.

11 Claims, 5 Drawing Figures

APPARATUS FOR HOLDING HOLLOW WALL PANELS WHILE THEY ARE FILLED WITH FOAMED PLASTIC

BACKGROUND OF THE INVENTION

This invention relates to apparatus used for making wall panels and in particular to apparatus used to hold the wall panels while in their hollow state while they are filled with a foamed plastic.

The wall panels made in the novel apparatus are used for the ceiling and the floor of transportation vehicles such as buses. In the past it has been the practice of manufacturers of buses to form a framework on the chasis of the vehicle and then to cover the framework to form the walls of the vehicle. The time required for making a vehicle wall under the old method is much greater than that which is required by using applicant's novel apparatus.

The use of wall panels that have been formed from a pre-fabricated sandwich of plastic foamed between a pair of spaced parallel sheets is old as illustrated by U.S. Pat. No. 3,614,848. A method for manufacturing wall panels having a foamed plastic core using vertically oriented platens is illustrated in U.S. Pat. No. 3,846,525. Another method for forming large reinforced foamed plastic panels having horizontally oriented platens is illustrated in U.S. Pat. No. 4,036,923. None of the prior art apparatus for forming foamed plastic panels illustrates the novel apparatus structure invented by the applicant.

It is an object of the invention to provide a novel apparatus for holding hollow wall panels while they are filled with foamed plastic.

It is also an object of the invention to provide a novel apparatus for holding hollow wall panels while they are filled with foamed plastic whose platens are concrete slabs.

It is also an object of the invention to provide a novel apparatus for holding partially assembled wall panels of a bus while they are filled with foamed plastic.

It is a further object of the invention to provide a novel apparatus whose platens are actuated in response to the filling of inflatable structure beneath one of its platens.

It is an additional object of the invention to provide a novel apparatus whose platens are actuated in response to the filling of fire hoses beneath one of its platens with pneumatic pressure.

SUMMARY OF THE INVENTION

The novel apparatus for holding hollow wall panels while they are filled with foamed plastic has a base, a lower platen, an upper platen and inflatable structure positioned between the top pressure surface of the base and the bottom pressure surface of the lower platen. The base, the lower platen, and the upper platen are elongated in shape and are made of concrete. Longitudinally spaced upon the lateral sides of the apparatus are combination support and spacer units. These units each have a tubular sleeve member respectively attached to the lateral side of the upper and lower platens. A tubular spacer member has its opposite ends in contact with these respective tubular sleeve members and a tie rod passes vertically down through all three members with locking nuts on its opposite ends whereby this structure maintains a predetermined vertical spacing between the base and the upper platen.

The inflatable structure between the base and the lower platen is a plurality of fire hoses that extend longitudinally along the length of apparatus and having its opposite ends extending outwardly therefrom. These hoses are attached at their opposite ends to a manifold whose pipes are in turn connected to a source of pressurized air.

In operation the hollow wall panels are slid into the spacing between the upper and lower platens. The hollow wall panels have channel shaped extrusions along their lateral sides that are engaged by the plurality of longitudinally spaced roller support brackets that are secured to the underside of the upper platen adjacent its opposite lateral sides. Once the hollow wall panels have been properly positioned within the apparatus, pressurized air is released into the hoses causing them to inflate and lift the lower platen upwardly into contact with the bottom surface of the hollow wall panel. A plurality of stop block spacers are secured to the under side of the upper platen to limit how close the top pressure surface of the lower platen can travel toward the bottom pressure surface of the upper platen.

With the hollow wall panels properly secured in the apparatus, the interior of the wall panels is filled with a foamed plastic which during its expansion and setting stages will attempt to force the top and bottom walls of the wall panels outwardly. The rigid structure provided by the apparatus will confine these outward pressures during the time period during which the foamed plastic is setting up into a solid state. At this point a valve is opened in the manifold system and the air would be released from the fire hoses causing the lower platen to lower to its initial position. A plurality of stop limit blocks limit how close the bottom surface of the lower platen can travel toward the top pressure surface of the base. At this point the foamed filled wall panel would be slid out of the apparatus on the rollers upon which it had been supported and a new hollow wall panel could be inserted to start the operation again.

DESCRIPTION OF THE PREFERRED EMBODIMENTS

Figure 1:
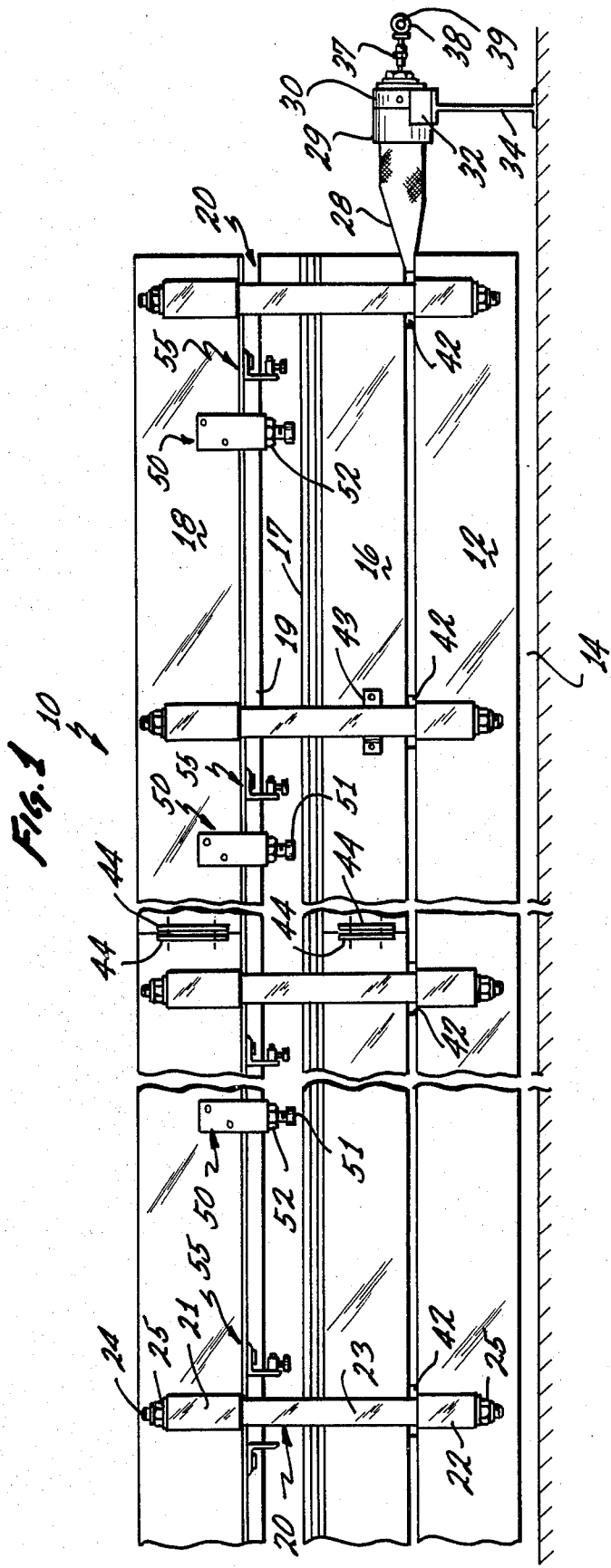
FIG. 1 is a partial side elevation view of the novel apparatus.
Figure 2:
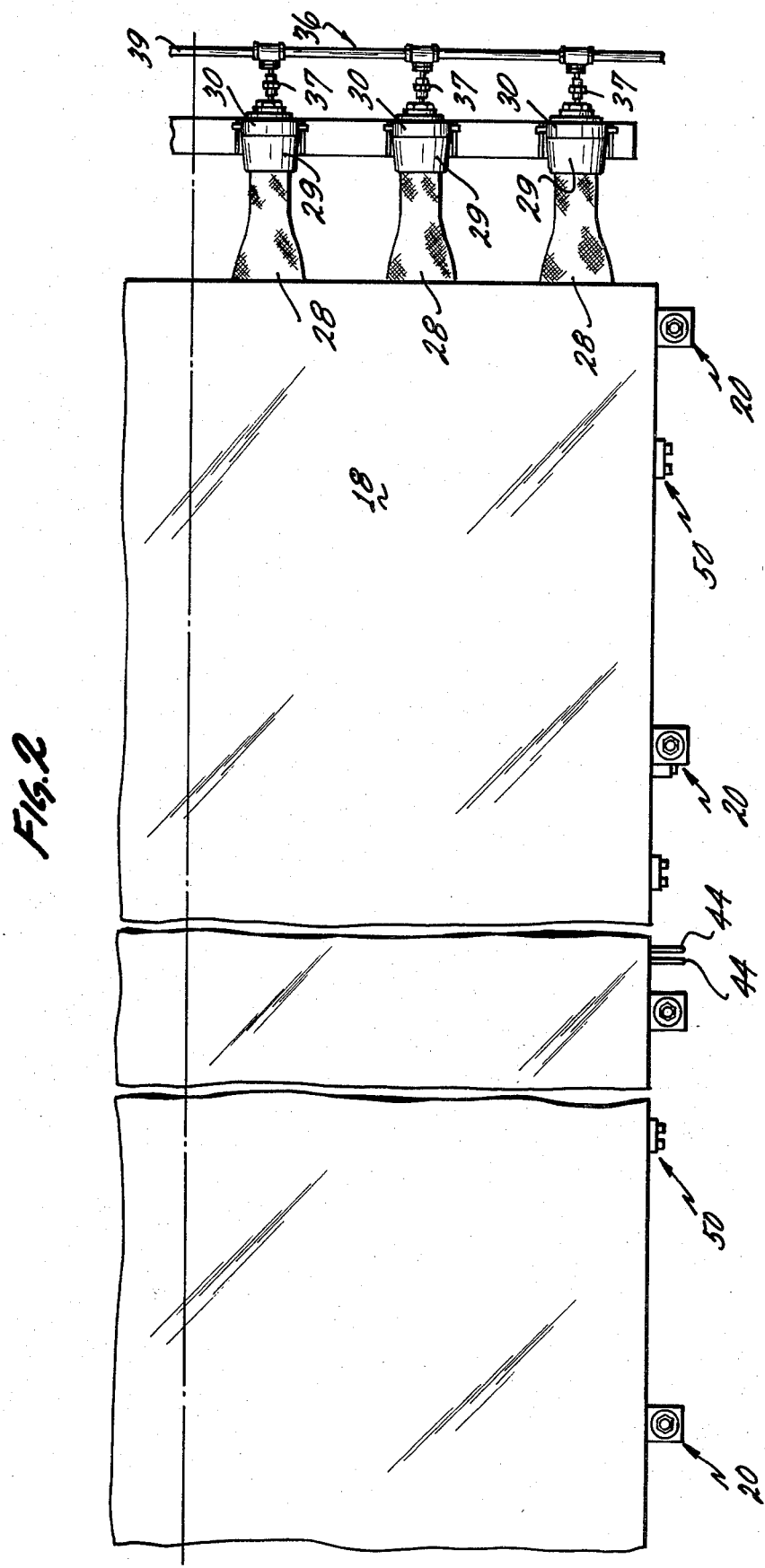
FIG. 2 is a partial top plan view of the apparatus illustrated in FIG. 1.

Referring now to the drawings the novel apparatus for holding hollow wall panels while they are filled with foamed plastic will now be described. The apparatus is generally designated numeral 10. Due to space consideration FIG. 1 illustrates only the right half of the apparatus since the left half is symmetrical with the right half. Also FIG. 2 which illustrates the apparatus from above shows only the near half of the apparatus, it being understood that the back half of the apparatus is symmetrical with the front half.

The apparatus has a concrete base 12 positioned atop a slab 14. Above base 12 is found the lower platen 16 and the upper platen 18. The base 12 and the upper platen 18 are secured together in a rigid structure by a plurality of combination support and spacer units 20 that are longitudinally spaced along the opposite lateral sides of the apparatus. These combination support and spacer units 20 each have a tubular sleeve attached to the lateral side of the upper platen, a tubular sleeve 22 attached to the lateral side of the base, and a tubular spacer 23 whose opposite ends contact the respective tubular sleeves 21 and 22. A tie rod 24 extends vertically through the sleeves and spacer and nuts 25 threaded on the opposite ends of the tie rod maintain a predetermined vertical spacing between the base 12 and the upper platen 18.

Extending longitudinally between the base 12 and the lower platen 16 are a plurality of fire hoses 28 whose opposite ends extend outwardly from the ends of the apparatus. The ends of the hoses 28 have a collar 29 engaged by a collar coupling 30. A bracket 32 is attached to each of the collars for supporting them on hose support 34.

Attached to the ends of the fire hoses 28 is a manifold 36 comprised of connecting units 37, T-couplings 38, and air pressure pipe 39. Air pressure pipe 39 would be connected to a conventional source of pressurized air (not shown) and would have your normal exhaust valves in the line.

When the air has been exhausted from the fire hoses 28 stop limit blocks 42 limit how close the bottom surface of lower platen 16 can travel toward the top pressure surface of base 12. When the fire hoses 28 are inflated, lower platen 16 is caused to travel upwardly until it comes in contact with the bottom surface of the hollow wall panel 45. A plurality of stop block spacer assemblys 50 are longitudinally spaced and extend downwardly from the bottom surface of upper platen 18 to limit how close the top pressure surface 17 of the lower platen can travel toward the bottom pressure surface 19 of the upper platen. The stop block spacers 50 have a bolt 51 that may be threaded upwardly or downwardly to vary how close the top pressure surface 17 can travel toward the bottom pressure surface 19 depending upon the thickness of the hollow wall panel 45. A nut 52 would lock the bolt 51 in its desired position.

Figure 3:
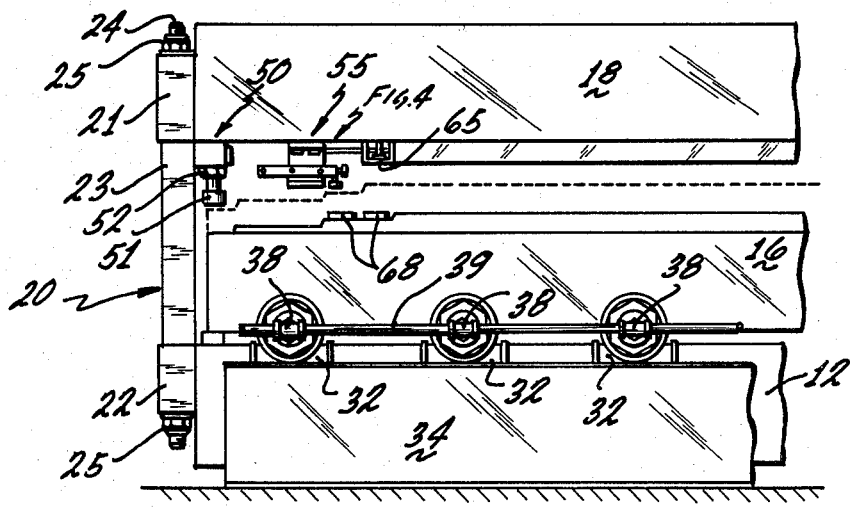
FIG. 3 is an end elevation view of the novel apparatus illustrated in FIG. 2.
Figure 4:
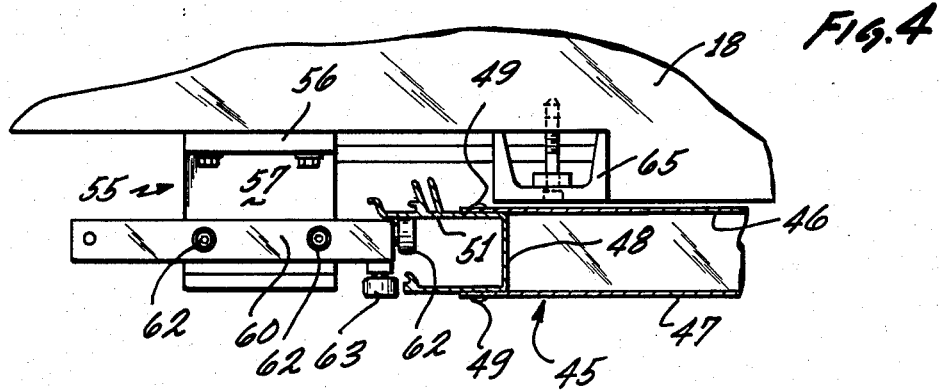
FIG. 4 is a partial end elevation view of the roller support bracket in a first position.
Figure 5:
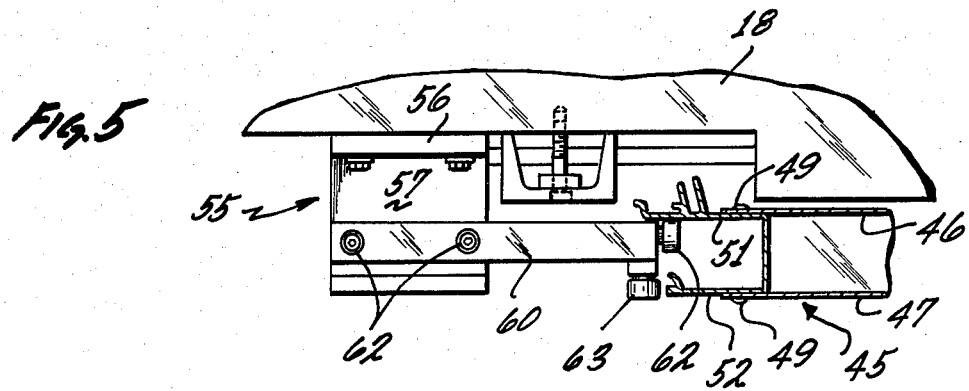
FIG. 5 is a partial end elevation view of the roller support bracket in a second position.

The structure for supporting the hollow wall panels 45 within the apparatus will now be described by referring to FIGS. 3-5. The wall panels 45 are formed from a top sheet of aluminum 46, a bottom sheet of aluminum 47 and an extruded U-shaped channel member 48 secured therebetween by rivets 49. U-shaped channel member 48 has a pair of laterally extending legs 51 and 52.

Secured to the underside of upper platen 18 are a plurality of longitudinally spaced and laterally positioned L-shaped roller support bracket assemblys. These L-shaped roller support bracket assemblys 55 each have a horizontal leg 56 and a vertically extending leg 57. Screws 58 secure the L-shaped roller support bracket assemblys to the underside of the upper platen 18. Extending inwardly from each of the bracket assemblys is a support arm 60 which has been secured to leg 57 by bolts 62. Attached to the ends of support arms 60 are rollers 62 and 63. The axis upon which roller 62 is mounted is horizontal so that it can engage leg 51 of the hollow wall panels. FIG. 4 illustrates the position of the support arm 60 when wider hollow wall panels are being foamed and FIG. 5 illustrates the position of support arm 60 when narrower hollow wall panels are being foamed. When the narrower hollow wall panels are being foamed, the upper pad members 65 are removed to the position illustrated in FIG. 5. Lower pad members 68 are attached to the top surface of lower platen 16 (see Fig. 3).

We claim:

1. Apparatus for holding hollow wall panels while they are filled with foamed plastic comprising:
   a base having a top pressure surface,
   first platen means having a top pressure surface and a bottom pressure surface, said first platen means being positioned above said base,
   second platen means having a bottom pressure surface, a plurality of longitudinally spaced roller support brackets extending downwardly from the bottom of said second platen means for supporting the hollow wall panels,
   means for supporting said second platen means above said first platen means,
   inflatable means positioned between the top pressure surface of said base and the bottom pressure surface of said first platen means for lifting said first platen means upwardly when a fluid under pressure is released into said inflatable means.

2. Apparatus for holding hollow wall panels while they are filled with foamed plastic as recited in claim 1 further comprising spacer means for limiting how close the bottom surface of said first platen means can travel toward the top pressure surface of said base when said inflatable means is deflated.

3. Apparatus for holding hollow wall panels while they are filled with foamed plastic as recited in claim 1 wherein said means for supporting said second platen means above said first platen means comprising means for maintaining a predetermined vertical spacing between said base and said second platen means.

4. Apparatus for holding hollow wall panels while they are filled with foamed plastic as recited in claim 1 further comprising spacer means for limiting how close the top pressure surface of said first platen means can travel toward the bottom pressure surface of said second platen means when said inflatable means is inflated.

5. Apparatus for holding hollow wall panels while they are filled with foamed plastic as recited in claim 3 wherein said means for maintaining a predetermined vertical spacing between said base and said second platen means comprises a plurality of combination support and spacer units, said units being attached to said base and said second platen means at spaced intervals along its lateral sides.

6. Apparatus for holding hollow wall panels while they are filled with foamed plastic as recited in claim 4 wherein said spacer means has vertically adjustable structure which allows for varying how close the top pressure surface of said first platen means can travel toward the bottom pressure surface of said second platen means.

7. Apparatus for holding hollow wall panels while they are filled with foamed plastic as recited in claim 5 wherein each of said combination support and spacer units comprises a vertically oriented sleeve member attached to said base, a vertically oriented sleeve member attached to said second platen means, a tubular spacer member having its opposite ends aligned with and abutting one end of each of said sleeve members and said spacer member, and a nut threaded on the opposite ends of said tie rod member.

8. Apparatus for holding hollow wall panels while they are filled with foamed plastic as recited in claim 1 wherein said inflatable means comprises a plurality of hoses laying on the top pressure surface of said base that are connected to a source of fluid under pressure.

9. Apparatus for holding hollow wall panels while they are filled with foamed plastic as recited in claim 8 wherein said hoses are aligned to extend longitudinally within said apparatus with said hoses extending outwardly from the opposite ends of said apparatus and being supported by a hose support.

10. Apparatus for holding hollow wall panels while they are filled with foamed plastic as recited in claim 1 wherein said base, first platen means, and second platen means are elongated in shape and made from concrete.

11. Apparatus for holding hollow wall panels while they are filled with foamed plastic as recited in claim 1 wherein the pressure surfaces of said apparatus are horizontally oriented.

* * * * *